(12) United States Patent
Collins et al.

(10) Patent No.: US 7,037,612 B2
(45) Date of Patent: May 2, 2006

(54) MOISTURE STABILIZATION FOR A FUEL CELL POWER PLANT SYSTEM

(75) Inventors: William P. Collins, South Windsor, CT (US); Kazuo Saito, Glastonbury, CT (US); Albert P. Grasso, Vernon, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 203 days.

(21) Appl. No.: 10/723,200

(22) Filed: Nov. 26, 2003

(65) Prior Publication Data

US 2005/0112429 A1    May 26, 2005

(51) Int. Cl.
 *H01M 8/18* (2006.01)
(52) U.S. Cl. ............ 429/20; 429/26; 429/17; 429/13
(58) Field of Classification Search ........ 429/34, 429/20, 19, 24, 26, 38, 39, 13, 17, 12; 422/187, 422/188
See application file for complete search history.

(56) References Cited

U.S. PATENT DOCUMENTS

| 4,530,886 A | 7/1985 | Sederquist | 429/13 |
| 4,539,267 A | 9/1985 | Sederquist | 429/17 |
| 5,382,478 A | 1/1995 | Chow et al. | 429/26 |
| 6,007,931 A | 12/1999 | Fuller et al. | 429/13 |
| 6,048,383 A | 4/2000 | Breault et al. | 95/44 |
| 6,120,923 A | 9/2000 | Van Dine et al. | 429/17 |
| 6,274,259 B1* | 8/2001 | Grasso et al. | 429/13 |
| 6,416,892 B1 | 7/2002 | Breault | 429/13 |

* cited by examiner

*Primary Examiner*—Raymond Alejandro
(74) *Attorney, Agent, or Firm*—Stephen A. Schneeberger

(57) ABSTRACT

An arrangement and process are provided for regulating the humidification or dew point of inlet air supplied (124, 224, 324, 424) to combustion-supported reaction means (20, 120) of a fuel processing system in a fuel cell power plant (110, 210, 310, 410). In addition to flowing exhaust gas(es) (28, 128) in heat and energy exchange relation with inlet air through a primary energy recovery device (ERD) (30) of the gas/gas type, a supplemental ERD (50) of the gas/liquid (water) type uses water temperature to passively condense moisture from a gas stream, either of inlet air or of exhaust gas, to regulate the dew point of the air supplied to the combustion-supported reaction means (20, 120). The supplemental ERD (50) may have a gas channel (134) and a water channel (132) separated by an enthalpy exchange barrier (136), and may be relatively upstream or downstream of the primary ERD (30) relative to the flow of inlet air through the latter to regulate dew point indirectly or directly, respectively.

18 Claims, 6 Drawing Sheets

MOISTURE STABILIZATION FOR A FUEL CELL POWER PLANT SYSTEM

TECHNICAL FIELD

This invention relates to fuel cell power plants, and particularly to humidification regulation in a fuel cell power plant. More particularly still, the invention relates to moisture stabilization in a fuel cell power plant.

BACKGROUND ART

Fuel cell power plants are commonly used to produce electrical energy from reducing and oxidizing fluids to power electrical apparatus. In such power plants, one or typically a plurality, of planar fuel cells are arranged in a fuel cell stack, or cell stack assembly (CSA). Each cell generally includes an anode electrode and a cathode electrode separated by an electrolyte. A reducing fluid such as hydrogen is supplied to the anode electrode, and an oxidant such as oxygen or air is supplied to the cathode electrode. The reducing fluid and the oxidant are typically delivered to and removed from the cell stack via respective manifolds. In a cell using a proton exchange membrane (PEM) as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes, depending on operating requirements and limitations of the working environment of the fuel cell. One such electrolyte is a PEM electrolyte, which consists of a solid polymer well known in the art. Other common electrolytes used in fuel cells include phosphoric acid, sulfuric acid, or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials, is fixed and cannot be leached from the cell, and has a relatively stable capacity for water retention. Typically also, provision is made for a coolant system in association with the fuel cell for removing product water from the cell, for serving a cooling function, and for providing a source of water for other functions associated with the fuel cell power plant. There should be a general balance of water in the coolant system for the reasons mentioned above and for the specific uses to be described. The power plant should be self sufficient with respect to water consumption in order to avoid, or at least minimize, dealing with possible impurities in make-up water.

It is known to recycle both heat and water contained in various power plant exhaust gases to improve the efficiency of the system and maintain the water balance. Typically, this may be done by passing the incoming air for the cathode through a sink channel of an energy transfer device (ERD), sometimes also referred to as a water transfer device (WTD), and passing the warm and moisture-laden exhaust gases through an adjacent source channel of the device. An enthalpy exchange barrier separates the source and sink channels and allows the transfer of heat and water vapor from the exhaust gases flowing in the source channel to the air flowing in the sink channel. This serves to humidify the incoming air supplied to the cathode, and does so in a manner that retains water within the system. One source of moisture-laden exhaust gas is the exhaust stream from the cathode itself. An example of such an arrangement is disclosed in U.S. Pat. No. 6,120,923 to Leslie L. Van Dine, et al, assigned to the assignee of the present invention. Another similar arrangement is described in U.S. Pat. No. 6,274,259 to Albert P. Grasso, et al, also assigned to the assignee of the present invention.

In addition to the fuel cell stack assembly, many fuel cell power plants also include the capability of processing a source of raw fuel into a hydrogen-rich fuel stream as the reducing fluid for delivery to the anode of the CSA. The raw fuel is typically some form of hydrocarbon, and a fuel processing system (FPS) is used to reform the fuel to the desired hydrogen-rich stream. A typical FPS uses one or more reactors to reform the raw hydrocarbon to a hydrogen-rich stream having acceptably low levels of CO. In almost all such instances, the FPS includes reaction means, such as a catalytic steam reformer (CSR), an autothermal reformer (ATR), or a catalytic partial oxidizer (CPO), to effect the basic reformation of the raw hydrocarbon fuel to a hydrogen-rich stream, and additional components may then enhance and clean that stream for use by the CSA. In each of those instances, the reaction means has a combustion process associated with it for the generation of heat, such that it may be termed a combustion-supported reaction means. The heat facilitates the reformation reaction and may be responsible for raising steam in certain instances.

The combustion that provides the heat may occur directly in the reactor, in a combustion or burner, zone, as in an ATR or a CPO, or it may take place in a burner externally of the actual reactor and be applied thereto through a heat transfer mechanism, as in a CSR. In either event, the same inlet air that is typically passed through the sink channel of the ERD for supplying oxidant to the cathode of the CSA may also be supplied to the combustion-supported reaction means to support at least the combustion process. Exhaust from the combustion-supported reaction means may be combined with the cathode exhaust to provide the exhaust gas stream that flows through the source channel of the ERD. This process is also described in the aforementioned U.S. Pat. Nos. 6,120,923 and 6,274,259.

While the humidification of the inlet air is generally beneficial for normal operation of the fuel cell power plant, and particularly the CSA, it is possible for that humidification and/or the mechanisms which provide it to experience extremes that are undesirable. For example, during start-up, the increased water content of the inlet air may overwhelm and prevent operation of the combustion-supported reaction means associated with the FPS. More particularly, for a range of combined oxygen, inert gas, and particular fuel gas concentrations, there exists a corresponding range of flammability for the combined gases. However, there also exists, for the range of combined gas concentrations, the flammability of the fuel gas as a function of the dew point of the resulting gas mixture. While the range or area of flammability for the combined gases may be relatively large, it is nevertheless critical that the dew point or water content of the air/fuel gas combination be such that a plot of the flammability as a function of dew point, falls within the overall range of flammability for proper combustion to occur. However, it is possible for the water content of the air issuing from the primary ERD to become sufficiently high during plant start-up that operation of the combustion-supported reaction means is not possible. This may occur because the cathode exhaust flow is negligible at that time, which means the controlling flow is the burner exhaust, which is much higher in temperature.

Thus, there is need for a technique of and system for, moisture stabilization of the inlet air supplied at least to the combustion-supported reaction means of a FPS in a fuel cell power plant. There is additionally need of attaining such moisture stabilization of the inlet air supplied to the combustion-supported reaction means in a manner and/or by means that is economical of space and/or weight.

DISCLOSURE OF INVENTION

An improved method and arrangement are provided for controlling or stabilizing the humidification or dew point of inlet air supplied to a fuel processing system in a fuel cell power plant. The fuel cell power plant includes a fuel cell stack assembly (CSA), a fuel processing system (FPS), and a primary energy recovery device (ERD). The CSA has an anode region having an inlet and an outlet, a cathode region having an inlet and an outlet, and an electrolyte region intermediate the anode and cathode regions. The FPS includes combustion-supported reaction means for receiving a supply of fuel and oxidant and providing a hydrogen-rich fuel stream to the anode inlet. The combustion-supported reaction means may comprise a catalytic steam reformer (CSR) with separate burner, or may alternatively comprise a reformer structured for integral combustion therewithin, such as an ATR or CPO. The primary energy recovery device typically has adjacent source and sink channels separated by an enthalpy exchange barrier for the transfer of heat and moisture therebetween, and is typically of the gas/gas type. An inlet oxidant stream is operatively connected to the cathode region inlet and to the combustion-supported reaction means via the sink channel of the primary energy recovery device. The combustion-supported reaction means has an exhaust stream, and the cathode region has an exhaust stream at the cathode region outlet. At least one, and typically both, of the combustion-supported reaction means exhaust stream and the cathode region exhaust stream is/are passed as an exhaust gas stream through the source channel of the primary energy recovery device to provide a source therein of heat and moisture for transfer to the inlet oxidant stream in the sink channel thereof. A passive condensing device, such as a further, or supplemental, small and simple energy recovery device (ERD) provides for a gas to flow therethrough in proximity with a liquid therein for the transfer of heat and moisture between the fluids to directly or indirectly regulate the dew point of the air supplied to the combustion-supported reaction means of the FPS. In one embodiment, adjacent liquid and gas channels are provided in the supplemental ERD, and are separated by an enthalpy exchange barrier that allows the transfer of heat and moisture between the fluid streams flowing in the respective channels. The enthalpy exchange barriers of the primary and supplemental ERDs may comprise a fine pore saturator medium. Alternatively, the supplemental ERD may be a structure such as a bubble or contact saturator or the like, in which the gas stream and the liquid are brought into direct contact without the presence of an intermediate porous energy exchange barrier. The gas channel of the further, or supplemental, ERD and one of the source channel and the sink channel of the primary ERD are serially connected, such that water flowing through the liquid channel of the further ERD controls, at least indirectly, the dew point of the oxidant stream supplied to at least the combustion-supported reaction means, and typically also to the cathode region. The further ERD, preferably being of the gas/liquid type, may be positioned downstream or preferably upstream of the primary ERD, relative to the fluid flows therethrough.

In one embodiment, the further ERD may be located relatively downstream of the primary ERD, and the inlet air discharged from the sink of the primary ERD is flowed through the gas channel of the further ERD prior to its delivery to the combustion-supported reaction means. A supply of liquid, such as coolant water, is flowed through the liquid channel of the further ERD to regulate the dew point of the inlet air in flowing in the gas channel.

In a more preferred embodiment, the further ERD is located relatively upstream of the primary ERD and one, or both, of the combustion-supported reaction means exhaust stream and the cathode region exhaust stream is/are passed as an exhaust gas stream through the gas channel of the further energy recovery device prior to being passed through the source channel of the primary energy recovery device. A source of liquid, such as coolant water, is passed through the liquid channel of the further energy recovery device for regulating the dew point of the exhaust gas stream being passed through the gas channel of the further energy recovery device and, indirectly, the dew point of that stream as it is flowed through the source channel of the primary ERD. This is done by regulating the temperature of the water passed through the liquid channel, which in turn serves to regulate the dew point of the gas in the gas channel. In this way it is possible to assure sufficient water is present in the gas stream entering the source channel of the primary ERD to prevent dry-out of the leading edges of that ERD's enthalpy exchange barrier which, if not prevented, may lead to gas seal and performance problems.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
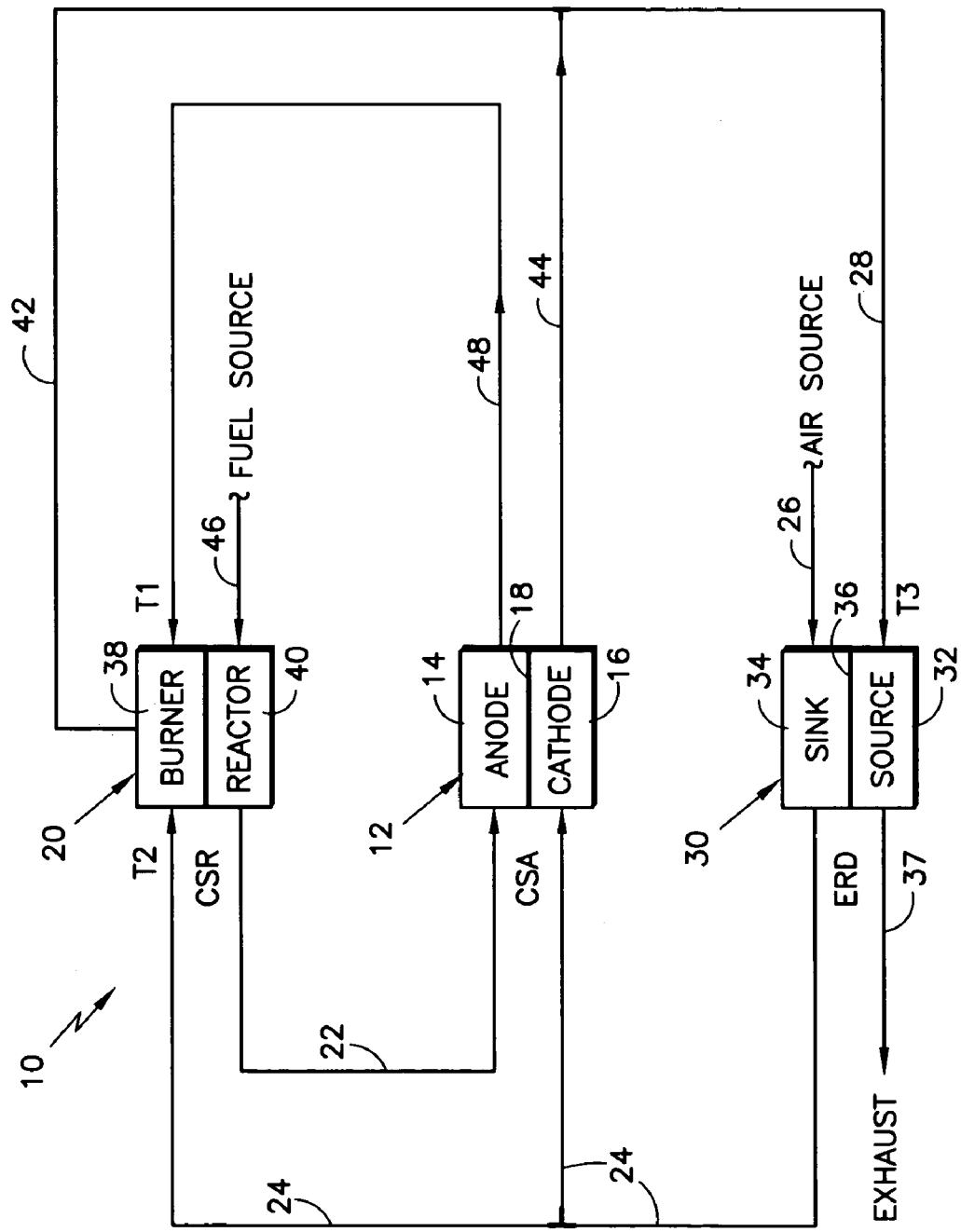
FIG. 1 is a simplified schematic diagram of a fuel cell power plant including a primary energy recovery device connected to a cell stack assembly and the combustion-supported reaction means of a fuel processing system in accordance with the prior art.

Referring to FIG. 1, there is illustrated in simplified schematic form, a fuel cell power plant 10 generally in accordance with the prior art as described above in the Background Art section. The power plant 10 is depicted as including only those components essential to an understanding of the present invention, and it will be understood and appreciated that considerable additional detail has been omitted for the sake of brevity. To the extent required, reference may be made to the aforementioned U.S. Pat. Nos. 6,120,923 and 6,274,259 for additional detail. The depicted power plant 10 includes a fuel cell stack assembly (CSA) 12, a fuel processing system (FPS) including at least combustion-supported reaction means 20, and a primary energy recovery device (ERD) 30.

The CSA 12 has an anode region 14, a cathode region 16, an electrolyte region 18, and typically also a coolant flow channel (not separately shown). A hydrogen-rich fuel stream 22 is supplied to the CSA anode 14 from the combustion-supported reaction means 20 of the FPS. A stream of oxidant 24, typically air from an inlet air source stream 26, is supplied to the cathode 16 following passage through the primary ERD 30. The CSA 12 operates in a well-known manner described earlier, to electrochemically react the hydrogen and oxidant to provide an electrical current to an external electrical circuit, and to create by-product water.

To improve the efficiency of the power plant system and maintain the water balance, the heat and water contained in various power plant exhaust gases are recycled in an exhaust gas stream 28 that is passed through a Source channel 32 of the primary ERD 30. The inlet air source stream 26 is passed through a Sink channel 34 of the ERD 30 prior to being supplied to the cathode 16 in the oxidant stream 24. One or more enthalpy exchange barriers 36 of known design, as of a fine pore saturator medium, typically of graphite or the like, separates and isolates the Source channel, or channels, 32 from the Sink channel, or channels 34, but allows the transfer of heat and water vapor between the exhaust gases 28 flowing in the Source channel 32 and the inlet air source stream 26 flowing in the Sink channel 34 as a result of the porosity of the barriers. This serves to humidify the incoming air supplied to the cathode 16, and does so in a manner that recovers/retains water within the system. The exhaust gases passed through Source channel 32 are discharged as exhaust stream 37, and may be discharged from the system.

The power plant 10 also includes a fuel processing section, not separately identified, which includes at least combustion-supported reaction means 20 for providing a hydrogen-rich stream for the CSA 12, and may also include additional components for further refining and/or cleaning the hydrogen-rich stream prior to its delivery to the anode 14. The combustion-supported reaction means 20 may be any of a variety of types, including a catalytic steam reformer (CSR), an autothermal reformer (ATR), or a catalytic partial oxidizer (CPO), to effect the basic reformation of the raw hydrocarbon fuel to the hydrogen-rich stream. In each instance, the reaction means has a combustion process associated with it for the generation of heat. The heat facilitates the reformation reaction. The combustion that provides the heat may occur directly in the reactor, in a combustion or burner zone, as in an ATR or a CPO, or it may take place in a burner externally of the actual reactor and be applied thereto through a heat transfer mechanism. In the embodiment of FIG. 1, the combustion-supported reaction means 20 is a CSR, in which a burner 38 is separate from the actual reactor 40. In either event, the same inlet air 26 that is passed through the Sink channel 34 of the ERD 30 for supplying oxidant, via stream 24, to the cathode 16 of the CSA 12 is also supplied, via stream 24, to the combustion-supported reaction means 20 to support the combustion process. In the illustrated instance, the air is conveyed, via stream 24, to the burner 38. Exhaust stream 42 from the combustion-supported reaction means 20 may be combined with a cathode exhaust stream 44 to provide the exhaust gas stream 28 that flows through the Source channel 32 of the ERD 30. The main hydrocarbon fuel source feedstock is supplied in stream 46 to the reactor 40, where it is reacted to provide, directly or following additional processing, the hydrogen-rich fuel stream 22 supplied to the anode 14. The fuel source for burner 38 during start-up may be derived from the fuel source stream 46 or a related source, as represented by supply 46', but is efficiently provided, at least partly, by the remaining unburned hydrocarbons in the anode exhaust gas stream 48.

Figure 2:
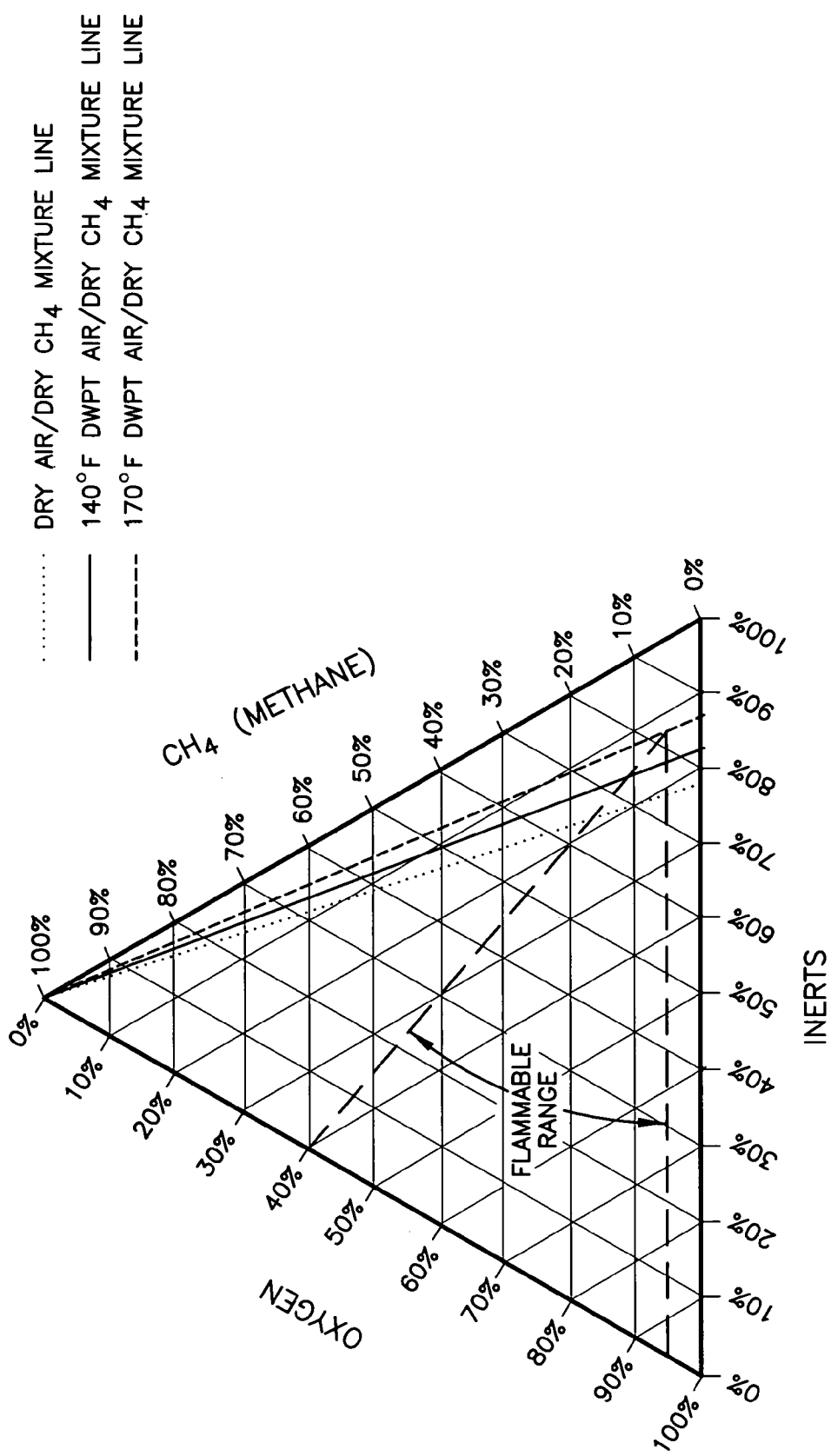
FIG. 2 is a plot of the flammability of a fuel gas, methane, in the presence of oxygen and inert gases derived from air, as functions of both the concentrations of those gases and the dew point of the air.

However, for adequate combustion by burner 38 of the fuel in either the anode exhaust fuel gas stream 48 or the start-up fuel gas stream 46' in order to support the reaction in reactor 40, a variety of conditions must be met. Referring to FIG. 2, there is depicted a plot of the flammability of a fuel gas, such as methane, in the presence of oxygen and the various inert gases in air, which make up the supplied oxidant. The flammability of the fuel is depicted firstly as a function of the relative concentrations of the three components mentioned in the preceding sentence, and appears as an area denoted as the "Flammable Range" toward the lower right of FIG. 2. While the chemical make-up of those several gaseous constituents is an important factor, a further factor particularly with respect to the support of combustion during a start-up phase of operation, is the dew point or humidity of the air supplied in stream 24 to burner 38. To reflect the importance of the dew point of the air, FIG. 2 further depicts traces of the impact on flammability of differing dew points of air relative to dry methane, in typical air/methane mixtures. Those traces are for dry air, 140° F. (60° C.) dew point air, and 170° F. (77° C.) dew point air. It will be seen that for the dry air, the trace passes through the Flammable Range; for the somewhat humidified air having a 140° F. (60° C.) dew point, the trace only barely enters the Flammable Range; and for the highly humidified air having a dew point of 170° F. (77° C.), the trace simply and importantly does not pass through the Flammability Range. Thus, for a condition of excessively high humidification of the inlet air, the lack of resulting combustion inhibits or prevents the creation and supply of hydrogen-rich fuel to the anode. This condition may arise at start-up with the configuration of FIG. 1, as will be explained.

Returning to a consideration of FIG. 1, during normal operation the dew point (T1) of anode exhaust 48 entering the CSR burner 38 is about 160° F. (71° C.) and the dew point (T2) of the inlet air 24 entering burner 38 is about 120° F. (49° C.), which results in the dew point (T3) of the exhaust gas mixture 28 of burner exhaust 42 and CSA 12 cathode exhaust 44 being about 145° F. (63° C.). However, during start-up, the flow of CSA cathode exhaust 44 is negligible, which results in the exhaust gas mixture 28 dew point (T3) being about 180° F. (82° C.) as it enters the primary ERD 30. The increase in dew point to the Source channel 32 of the RED 30 serves to significantly increase the dew point (T2) of the air issuing from the Sink channel 34 and introduced to burner 20 via stream 24, to about 170° F. (77° C.). This presents the burner with substantially more water than during normal operation, and possibly so much as to inhibit or prevent proper operation of the burner 38 and/or combustion-supported reaction means 20, as will be understood from the prior discussion of FIG. 2. It should be understood that the temperatures mentioned herein with respect to the Figures, and particularly FIGS. 1 and 3–6, are meant to be arbitrary and merely exemplary and in no way limiting, and are cited principally for illustrative comparative purposes.

Figure 3:
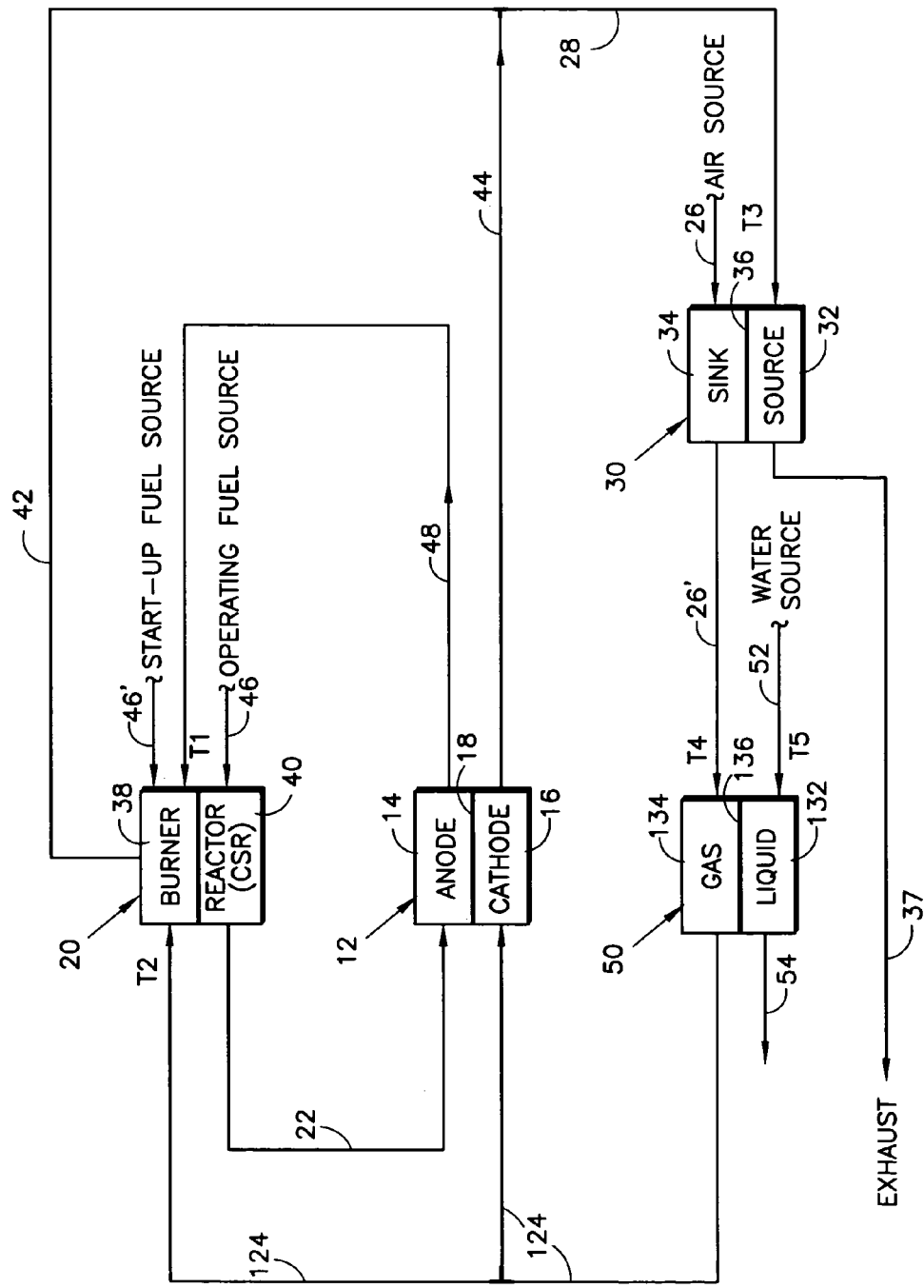
FIG. 3 is a simplified schematic diagram of a fuel cell power plant similar to that of FIG. 1, but additionally including a further energy recovery device of the gas/liquid type for controlling the dew point of the air supplied to the combustion-supported reaction means in accordance with one embodiment of the invention.

Referring now to FIG. 3, there is illustrated, in simplified schematic diagram form, a fuel cell power plant 110 similar to that of FIG. 1 but which, in accordance with the invention, additionally includes means for controlling or stabilizing the dew point of air being delivered to and thereby assuring or enhancing the proper operation of, the burner 38 and/or combustion-supported reaction means 20. Reference numbers identical to those of FIG. 1 are used in FIG. 3 for those components that are the same, or substantially the same, in the two configurations. However, where there is some functional, compositional, or structural difference occasioned by the invention, but the components of FIG. 3 nevertheless remain analogous to components in FIG. 1, they have been given the same reference number, but preceded by a "1". A similar convention will be used for the reference numerals of the embodiments of FIGS. 4–6, however the initial digit of three-digit numbers may differ to reflect difference from a previously-described embodiment. The following description will emphasize the novel character, structure, and/or function of the contaminant removal system of the invention, and will attempt to minimize repetition of description that is duplicative of that provided with respect to FIG. 1.

As with the prior art embodiment of FIG. 1, the FIG. 3 embodiment of the invention includes CSA 12, a FPS including the combustion-supported reaction means 20, in this instance CSA reactor 40 and separate burner 38, and a primary ERD 30 for recovering system energy and applying humidification to the inlet air 26 that is supplied via stream 124 to the cathode 16 and to the burner 38. However, in accordance with the invention, a further, or supplemental, energy recovery device (ERD) 50 is included in the power plant 110 for controlling the dew point, or humidification, of the air supplied as oxidant to the CSA 12 and the combustion-supported reaction means 20. The supplemental ERD 50 is a gas/liquid ERD, and may be structurally similar in most respects to the primary ERD 30, having a Gas flow channel 134 similar to either the gas-flow Source channel 32 or the gas-flow Sink channel 34, a Liquid flow channel 132 similar to the gas flow channel but for conducting a liquid flow, and one or more enthalpy exchange barriers 136 of known design, as of a fine pore saturator medium, typically of carbon or the like. The enthalpy exchange barrier 136 generally separates the Liquid flow channel, or channels, 132 from the Gas flow channel, or channels 134, but allows the transfer of heat and water vapor from the fluid in one channel to the fluid in the other channel. This transfer typically occurs as the result of temperature differences between the liquid water and gas mixture dew point in the two adjacent channels. The gas stream dew point temperature will tend toward the coolant water temperature due to water vapor transfer between the two streams. As an alternative to the structure of the energy recovery devices described above, which have two fluid channels separated by a porous energy exchange barrier, the supplemental ERD 50 may take the form of a bubble saturator or contact saturator, or the like (not separately shown) which places the gas stream in direct contact with the liquid, which may exist as a pool or preferably as a stream, without the presence of an intermediate porous energy exchange barrier.

Referring in greater detail to the placement and function of the supplemental ERD 50 in the embodiment of FIG. 3, the supplemental ERD 50 is located in the inlet air flow path intermediate the primary ERD 30 and the combustion-supported reaction means 20, such that the supplemental ERD 50 is relatively downstream of the primary ERD 30. The air source 26 and the exhaust gas stream 28 respectively, are connected to the Sink channel 34 and Source channel 32 respectively, as in the FIG. 1 arrangement. Similarly, the Source 32 provides an exhaust 37. However, instead of the air flow that exits from the Sink channel 34 being directly connected to the combustion-supported reaction means 20, it is now instead designated 26' and extends to and through the Gas channel 134 of the supplemental ERD 50 before exiting as stream 124 that is connected to the burner 38 of the combustion-supported reaction means 20 and typically also, in parallel to cathode 16 of the CSA 12. It will be appreciated that if the dew point of the air 124 to be delivered to the cathode 16 is to be different than the dew point T2 of the air delivered to the burner 38 of the combustion-supported reaction means 20, the supplemental ERD 50 may be located in the air stream 124 for the burner 38 relatively after the split or junction of that air stream for the cathode 16. Further still, a supply of water, as from the power plant's coolant loop, not shown, is extended, via inlet water source stream 52, to and through the Liquid channel 132 of the supplemental ERD 50, and issues therefrom as discharge stream 54 for return to the coolant loop to maintain water balance in the system. The passage of water through the Liquid channel 132 serves, through indirect contact with inlet air 26' via the porous enthalpy exchange barrier 136, to control the dew point and water content of the inlet air 26' that has been preconditioned by flowing through Sink 34 of primary ERD 30. This control is accomplished by regulating the temperature (T5) of the water flowing through the Liquid channel 132. Such regulation of the water temperature (T5) may be accomplished by any of several known means, not shown, such as heaters, chillers, and the like, which may in turn be controlled by a thermostat or the like (not shown). It will be understood that a similar result may be obtained if the supplemental ERD 50 is of the type, such as a contact or bubble saturator, in which the water and inlet air are in direct contact without the presence of an intermediate porous enthalpy exchange barrier.

The air 26', following passage through the Sink channel 34 of primary ERD 30, has a dew point (T4) that may be similar to the dew point (T2) of the FIG. 1 embodiment as the result of the energy recovery from the exhaust stream 28 flowing through the Source channel 32. However, as noted, that dew point may be excessive during start-up, and the further tempering, or control, of that dew point during its passage through the Gas channel 134 of supplemental ERD 50, as effected by the temperature (T5) of the water in Liquid channel 54, assures a dew point (T2) that will support combustion even during start-up. Assuming a water temperature (T5) in Liquid channel 132 that is relatively less than the dew point (T4), the effect upon the air in Gas flow channel 134 is a reduction in temperature and the water vapor in the air stream 26' will be condensed in Gas channel 134 and migrate through the enthalpy exchange barrier 136 and be entrained in the water flowing through the Liquid channel 132. The water temperature (T5) thus directly regulates the dew point (T2) of the inlet air 124 to burner 38 to assure combustion during start-up.

While the foregoing embodiment of FIG. 3 provides significant advantages over the prior art embodiment of FIG. 1, it nevertheless exhibits certain limitations. Specifically, the leading (i. e., inlet) edges of the enthalpy exchange barrier 36 of the primary ERD 30 may begin to dry out, which in turn degrades the quality or effectiveness of the gas seal normally required to be provided by that barrier, as well as other performance issues. This may occur when the Source inlet stream 28 is either too warm and not fully humidified or is too cold, i. e., insufficient water even when fully saturated. This limitation may be overcome through the addition of water to the primary ERD 30 at or near the inlet to the source channel. While that addition of water might be accomplished via a spray nozzle at that location, an alternative is to locate the supplemental ERD 50 upstream of the primary ERD 30, as depicted in the embodiment of FIG. 4.

Figure 4:
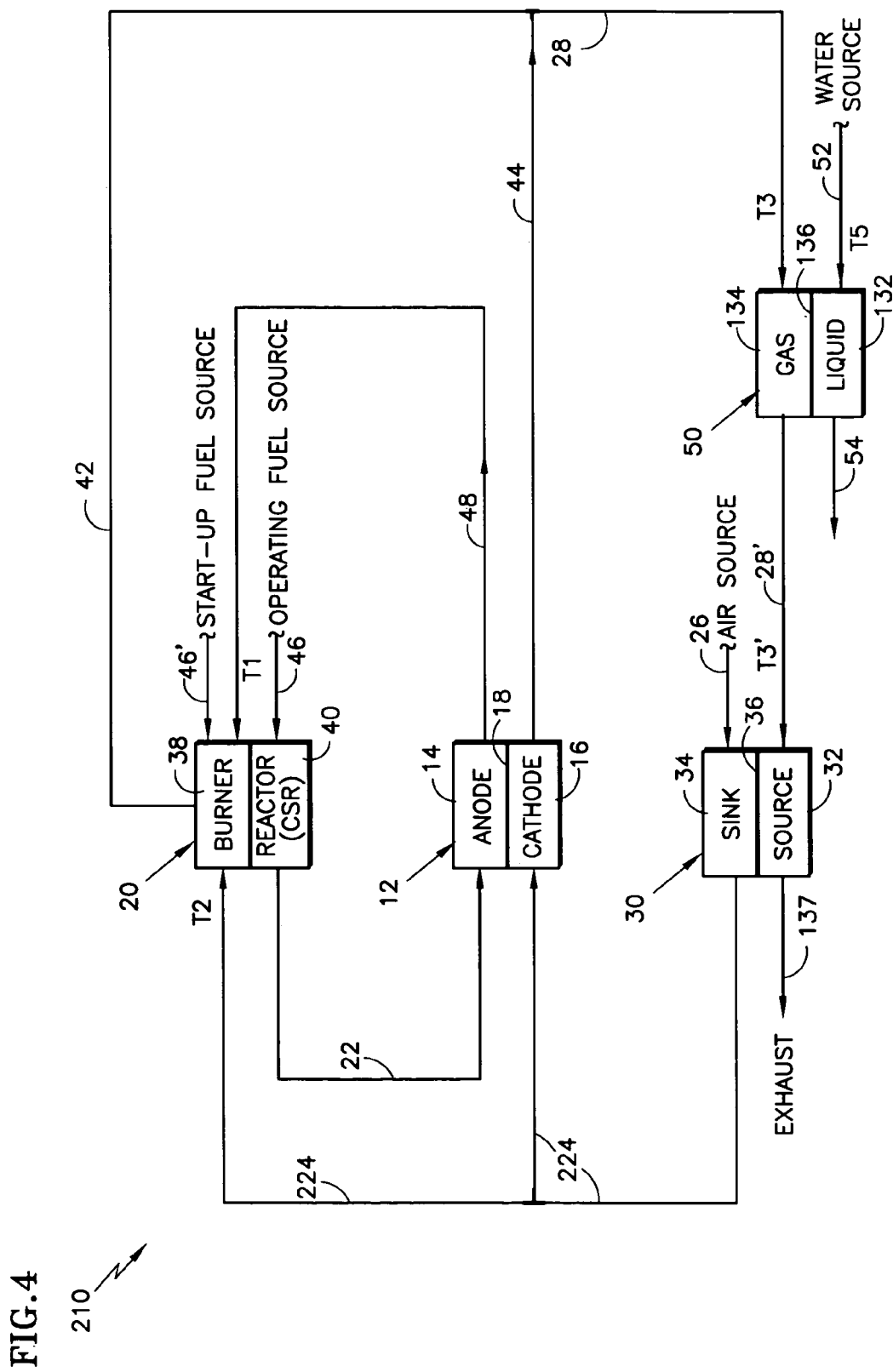
FIG. 4 is a simplified schematic diagram of a fuel cell power plant similar to that of FIG. 3, but illustrating an embodiment in which the further energy recovery device is preferably located upstream of the primary energy recovery device.

Referring to the fuel cell power plant 210 of FIG. 4, the supplemental ERD 50 is now positioned relatively upstream of the primary ERD 30. This continues to allow the supplemental ERD 50 to control the dew point (T2) of the air 224 delivered to burner 38 of the combustion-supported reaction means 20, albeit indirectly instead of directly, and it also reduces or eliminates the problem of ERD dry-out at the primary ERD 30.

Firstly, to the extent that the exhaust gas flow 28 (T3) may be hot and insufficiently humidified or even cold and insufficiently humidified, as may occur during start-up and other times, the flow of water through the Liquid channel 132 of supplemental ERD 50 assures a sufficient supply of moisture to barrier 136, and thus the gas flowing in Gas channel 134, to prevent dry-out of the barrier 136 and resulting loss of gas seal between the channels.

Secondly, that flow of water in Liquid channel 132, and the concomitant regulation of its temperature (T5), serves to regulate the dew point of the exhaust gas stream 28 flowing through Gas channel 134 and conveyed as stream 28' (T3') to the Source channel 32 of primary ERD 30. That gas is exhausted from the ERD 30 as exhaust stream 137. As noted with respect to the description of the original problem, that of excessive dew point (T2) of the air (here 224) supplied to burner 38 during start-up, the problem arises because the gas stream in the Source channel 32 is too warm and/or has a dew point that is excessive and/or unstable, and results in an excessive dew point to the air passing through the Sink channel 34. By controlling the water temperature (T5) to regulate the dew point (T3') of the exhaust gas stream 28' issuing from the supplemental ERD 50 via control of the water temperature (T5) as described above, there is an indirect, concomitant regulation of the dew point (T2) of air 224 to the burner 38. The regulation of the dew point (T3) of the exhaust gas stream 28' delivered to and passing through the Source channel 32 of the primary ERD 30, serves to correspondingly regulate the dew point of the air stream 26 flowing through the Sink channel 34 of that ERD such that the air 224 supplied at least to the burner 38 and typically also to the cathode 16 has an acceptable dew point. For example, whereas during start-up the exhaust gas stream 28 might have a particularly high dew point of 180° F. (82° C.), a water temperature (T5) of about 140° F. (60° C.) will result in a modified exhaust gas dew point (T3') of about 145° F. (63° C.) which in turn provides an acceptable dew point (T2) of about 125° F. (52° C.) to the air 224 supplied to the burner 38.

While the FIG. 3 and FIG. 4 embodiments described above are particularly well suited for use in power plant systems in which the combustion-supported reaction means 20 of the FPS employs a burner 38 separate from the CSR-type reactor 40, it is also instructive to consider use of the supplemental ERD 50 in conjunction with an FPS in which the combustion-supported reaction means is of the ATR or CPO type. In that instance, although there is combustion associated with the reaction process in order to provide heat, it is not in a separate burner but is instead integral with the ATR or CPO reaction means. In such instance, the partly-depleted hydrogen stream from the anode 14 is no longer supplied to the reactor or burner and more importantly, no longer does the combustion-supported reaction means yield an exhaust gas stream for passage through an ERD in a water recovery mode. However, it is still important to control the dew point associated with the combustion process in the ATR or CPO since that is one of the variables that set the oxygen/carbon (O/C) ratio of the reformer.

Figure 5:
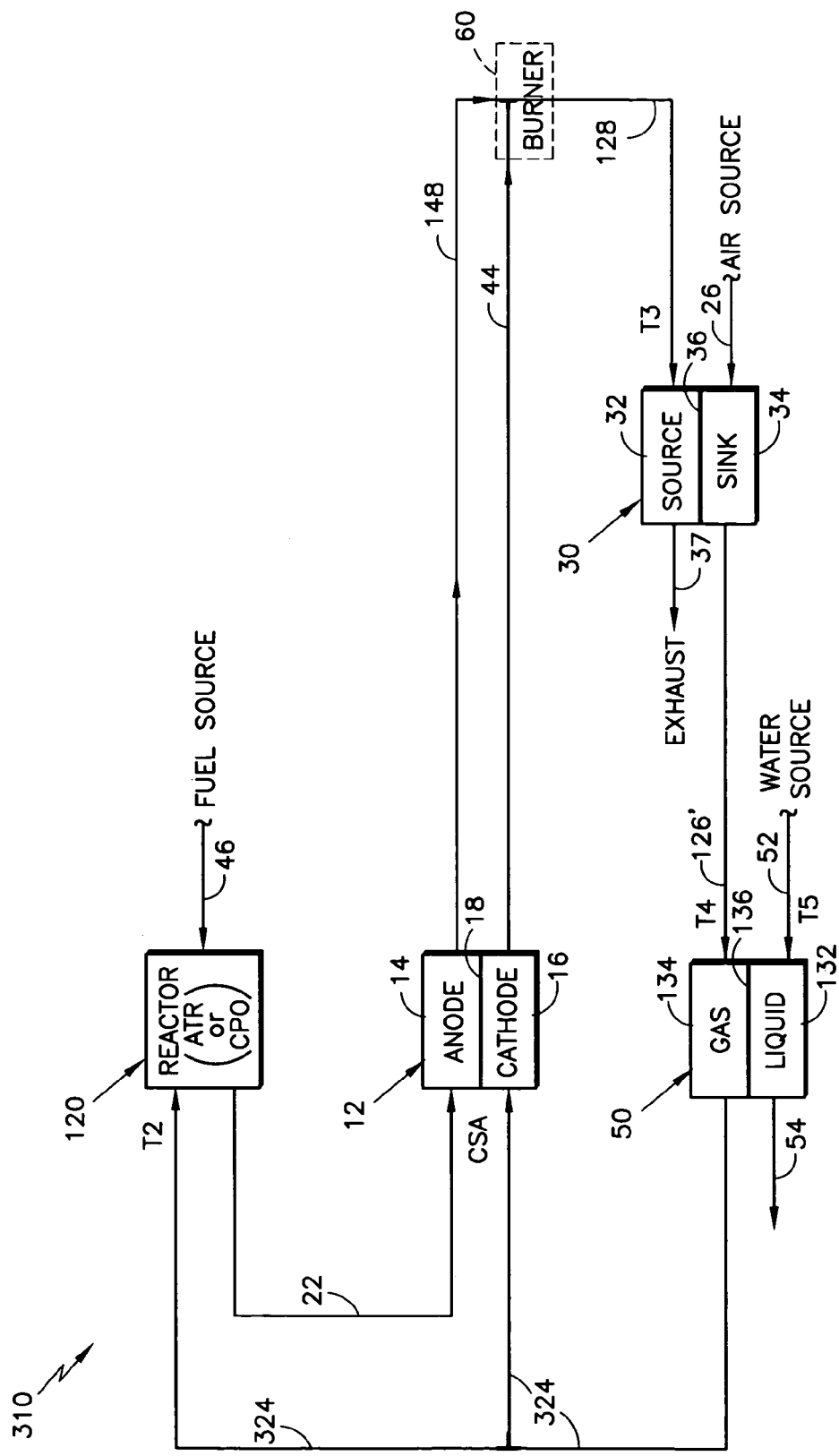
FIG. 5 is a simplified schematic diagram similar to that of FIG. 3, but illustrating the primary and the further ERDs in use with a fuel processing system having a combustion-supported reaction means of the CPO/ATR type.
Figure 6:
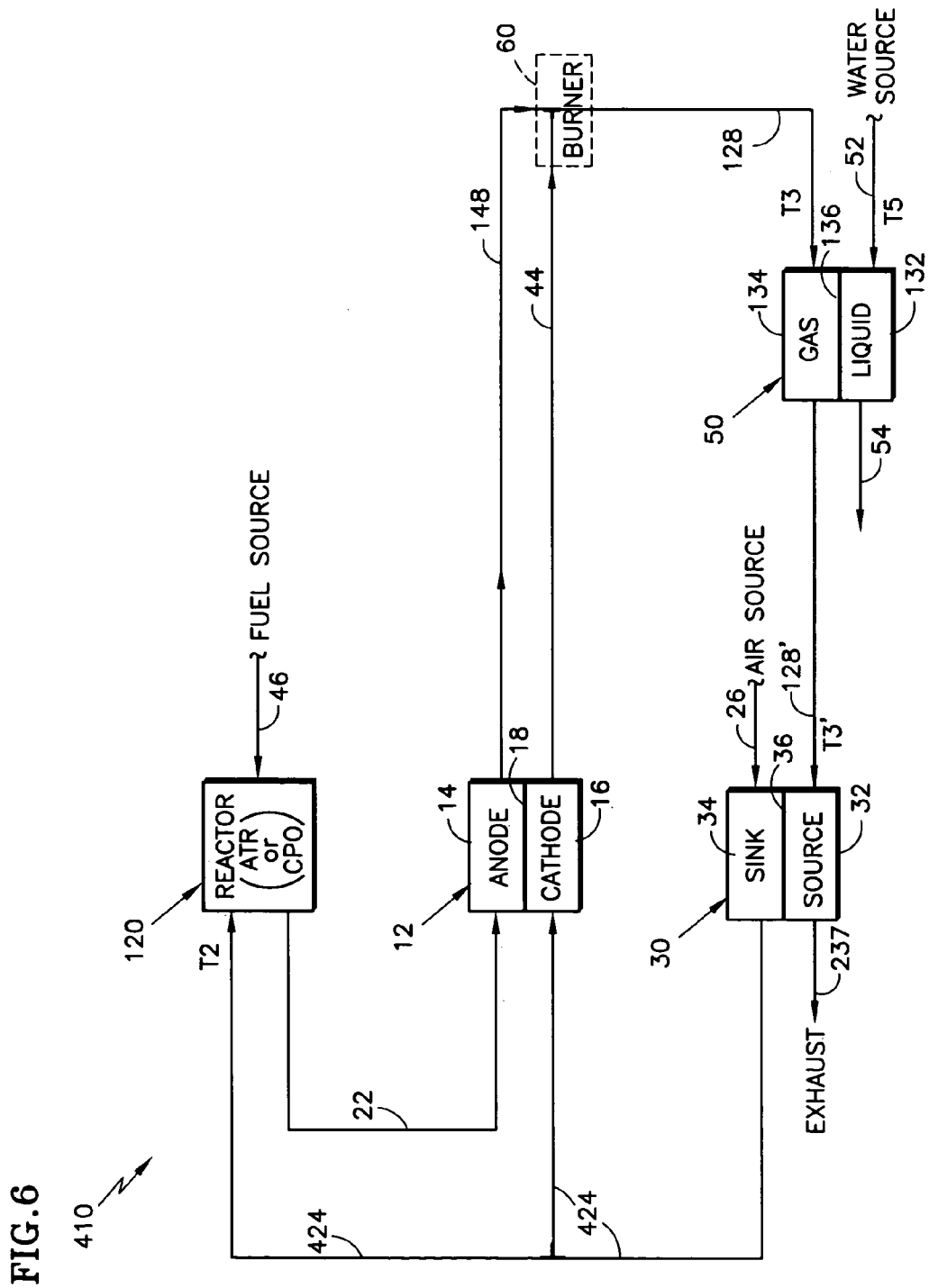
FIG. 6 is a simplified schematic diagram similar to that of FIG. 4, but illustrating the primary and the further ERDs in use with a fuel processing system having a combustion-supported reaction means of the CPO/ATR type.

Reference is now made to FIGS. 5 and 6 which depict embodiments of a fuel cell power plant in which the reactor, or combustion-supported reaction means 120, is an ATR or CPO or the like, for which there is no separate burner for the combustion process within. Rather, the fuel source 46 and the oxidant, or air stream 124, are reacted in a combustion-like manner in the presence of a catalyst in the reactor.

Referring first to the fuel cell power plant 310 of FIG. 5, it will be noted that the partly-depleted hydrogen stream exiting the anode 14 as exhaust stream 148 is not directed to the combustion-supported reaction means 120 but rather, is combined directly or indirectly, with the exhaust 44 from the cathode 16 to form combined exhaust gas stream 128. Because it remains important to regulate the dew point T2 of the oxidant 324 supplied to at least the reaction means 120, the power plant 310 is depicted as including a primary ERD 30 and a supplemental ERD 50 in the same sequence and configuration as described and depicted with respect to FIG. 3. The value of such supplemental ERD 50 may be even greater for a CSA 14 of the type that does not employ a fine pore media in association with water flow therethrough than for a CSA 14 of the type that does employ such fine pore media, because the dew points of the anode exhaust and the cathode exhaust may be relatively more constant for the latter-type CSA than for the former-type CSA. By positioning the supplemental ERD 50 relatively downstream of the primary ERD 30, it is possible through control of the temperature (T5) of the water supply 52 to directly regulate the dew point (T2) of the air stream 324 supplied to the reaction means 120.

The exhaust 148 from the anode 14 may still contain a significant amount of unused hydrogen, which may be undesirable for mixing with oxidant from cathode 16 and/or releasing directly to the atmosphere for reasons of safety, environment and/or economy. Although this is typically not an issue for a CSR-type reformer because that partially-depleted hydrogen stream is conducted to and burned in, the burner associated with the reformer, such is not the case for an ATR or CPO that has no such direct burner. Accordingly, there is depicted an optional burner 60 for receiving and combusting at least the anode exhaust 148, and typically also the cathode exhaust 44, to yield the exhaust gas stream 128 supplied for heat and moisture recovery to the primary ERD 30 and possibly also, supplemental heat for use in power plant 310. Otherwise, the functional advantages of the primary ERD 30 and supplemental ERD 50 are as they were with respect to the FIG. 3 embodiment.

Reference is made now to the fuel cell power plant 410 depicted in FIG. 6, which is the same in most respects as the fuel cell power plant 310 of FIG. 5 except that the positioning and flow sequence of the primary ERD 30 and the supplemental ERD are reversed, as in the FIG. 4 embodiment. The reaction means 120 is typically an ATR or a CPO, the supplemental ERD 50 relatively precedes the primary ERD 30 in the flow sequence of exhaust gas through the respective gas channels of the respective ERDs, and the air stream 424 having a conditioned dew point (T2) is supplied from the gas channel 134 of the primary ERD 30 to at least the combustion-supported reaction means 120, and typically also to the cathode 16. In this instance in which the supplemental ERD 50 precedes the primary ERD 30, the supplemental ERD 30 will control the burner dew point and O/C ratio indirectly. On the other hand, if the optional burner 60 is used, the thermal stress on the primary ERD 30 would be similar to the thermal stress which that ERD would experience in a CSR system, such as FIG. 1, during start-up. In such instance, the addition of the supplemental ERD 50 relatively upstream of the primary ERD 30 would yield the benefits noted for the FIG. 4 embodiment employing the CSR, as well as indirect control of the O/C ratio of the reformer 120.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A fuel cell power plant (110, 210, 310, 410) including in combination, a fuel cell stack assembly (12) having an anode region (14), a cathode region (16), and an electrolyte region (18) intermediate the anode and cathode regions; a fuel processing system including combustion-supported reaction means (20, 120) for receiving a supply of fuel (46, 46', 48) and an oxidant stream (124, 224, 324, 424) and for providing a hydrogen-rich fuel stream (22) to the anode region (14); a source of oxidant (26); a primary energy recovery device (30) having adjacent source (32) and sink (34) channels separated by an enthalpy exchange barrier (36) for the transfer of heat and moisture therebetween; a further energy recovery device (50) having means (132, 134, 136) for receiving gas and liquid and flowing at least the gas therethrough in proximity with the liquid for the transfer of heat and moisture therebetween to regulate the dew point of the gas; a source of water (52); at least one of the combustion-supported reaction means (20, 120), the cathode region (16), and the anode region (14) having an exhaust flow (42, 44, 48, 148) for providing an exhaust gas stream (28, 128); and wherein the oxidant source (26) is operatively connected to flow through at least the sink channel of the primary energy recovery device (30) to provide the oxidant stream (124, 224, 324, 424) supplied to at least the combustion-supported reaction means (20, 120), the exhaust gas stream (28, 128) is operatively connected to flow through at least the source channel of the primary energy recovery device (30), the water source (52) is operatively connected to provide the liquid to the further energy recovery device (50), and the further energy recovery device (50) and one of the source channel (32) and the sink channel (34) of the primary energy recovery device (30) are serially connected (26', 28', 126', 128') for gas flow therethrough, such that the regulation of the dew point of the gas flowing through the further energy recovery device (50) by the water in the further energy recovery device (50) operates to regulate, at least indirectly, the dew point of the oxidant stream (124, 224, 324, 424) supplied to at least the combustion-supported reaction means (20, 120).

2. The fuel cell power plant (110, 210, 310, 410) of claim 1 wherein the further energy recovery device (50) is upstream of the primary energy recovery device (30) relative to the gas flow therethrough, the exhaust gas stream (28, 128) flows through the further energy recovery device (50), and the regulation of the dew point of the oxidant stream (124, 224, 324, 424) is indirect.

3. The fuel cell power plant (110, 210, 310, 410) of claim 1 wherein the primary energy recovery device (30) is upstream of the further energy recovery device (50) relative to the gas flow therethrough, oxidant from source (26) flows through the further energy recovery device (50), and the regulation of the dew point of the oxidant stream (124, 224, 324, 424) is direct.

4. The fuel cell power plant (110, 210, 310, 410) of claim 1 wherein the oxidant stream (124, 224, 324, 424) applied to the combustion-supported reaction means (20, 120) is also applied, in parallel, to the cathode region (16).

5. The fuel cell power plant (110, 210, 310, 410) of claim 1 wherein the combustion-supported reaction means (20) comprises a catalytic steam reformer (40) and separate burner (38), and the burner (38) has an exhaust flow (42).

6. The fuel cell power plant (110, 210, 310, 410) of claim 5 wherein the cathode region (16) has an exhaust flow 44, the cathode exhaust gas flow (44) and the burner exhaust flow (42) being combined to form the exhaust gas stream (28).

7. The fuel cell power plant (110, 210, 310, 410) of claim 1 wherein the combustion-supported reaction means (120) comprises a reformer (120) structured for integral combustion therewithin.

8. The fuel cell power plant (110, 210, 310, 410) of claim 7 wherein the reformer (120) is from the group consisting of an autothermal reformer and a catalytic partial oxidizer.

9. The fuel cell power plant (110, 210, 310, 410) of claim 7 wherein the anode exhaust flow (148) comprises a partly-depleted hydrogen gas stream, and the cathode exhaust flow (44) and the anode exhaust flow (148) are combustively reacted in a burner (60) to provide the exhaust gas stream (128).

10. The fuel cell power plant (110, 210, 310, 410) of claim 1 wherein the further energy recovery device (50) comprises adjacent liquid (132) and gas (134) channels separated by an enthalpy exchange barrier (136), the gas flows through the gas channel (134), the water flows through the liquid channel (132), and the transfer of heat and moisture therebetween is via the enthalpy exchange barrier (136).

11. The fuel cell power plant (110, 210, 313, 410) of claim 10 wherein the enthalpy exchange barrier (36, 136) in each of the primary energy recovery device (30) and the further energy recovery device (50) comprises a fine pore saturator medium.

12. The fuel cell power plant (110, 210, 310, 410) of claim 1 wherein the temperature of the water supplied to the further energy recovery device (50) regulates the dew point of the oxidant stream (124, 224, 324, 424) supplied to at least the combustion-supported reaction means (20, 120).

13. A fuel cell power plant (110, 210, 310, 410) including in combination, a fuel cell stack assembly (12) having an anode region (14), a cathode region (16), and an electrolyte region (18) intermediate the anode and cathode regions; a fuel processing system including combustion-supported reaction means (20, 120) for receiving a supply of fuel (46, 46', 48) and an oxidant stream (124, 224, 324, 424) and for providing a hydrogen-rich fuel stream (22) to the anode region (14); a source of oxidant (26); a primary energy recovery device (30) having adjacent source (32) and sink (34) channels separated by an enthalpy exchange barrier (36) for the transfer of heat and moisture therebetween; a further energy recovery device (50) having adjacent liquid (132) and gas (134) channels separated by a fine pore saturator medium enthalpy exchange barrier (36, 136) for the transfer of heat and moisture therebetween to regulate the dew point of the gas flowing in the gas channel (134) as a function of the liquid; a source of water (52); at least one of the combustion-supported reaction means (20, 120), the cathode region (16), and the anode region (14) having an exhaust flow (42, 44, 48, 148) for providing an exhaust gas stream (28, 128); and wherein the oxidant source (26) is operatively connected to flow through at least the sink channel of the primary energy recovery device (30) to provide the oxidant stream (124, 224, 324, 424) supplied to at least the combustion-supported reaction means (20, 120), the exhaust gas stream (28, 128) is operatively connected to flow through at least the source channel of the primary energy recovery device (30), the water source (52) is operatively connected to flow at a controlled temperature through the liquid channel (132) of the further energy recovery device (50), and the gas channel (134) of the further energy recovery device (50) and one of the source channel (32) and the sink channel(34) of the primary enemy recovery device (30) are serially connected (26', 28', 126', 128') for gas flow therethrough, such that the regulation of the dew point of the gas flowing through the further energy recovery device (50) by the temperature of the water in the further energy recovery device (50) operates to regulate, at least indirectly, the dew point of the oxidant stream (124, 224, 324, 424) supplied to at least the combustion-supported reaction means (20, 120).

14. In a fuel cell power plant (110, 210, 310, 410) including in combination, a fuel cell stack assembly (12) having an anode region (14), a cathode region (16), and an electrolyte region (18) intermediate the anode and cathode regions; a fuel processing system including combustion-supported reaction means (20, 120) for receiving a supply of fuel (46, 46', 48) and an oxidant stream (124, 224, 324, 424) and for providing a hydrogen-rich fuel stream (22) to the anode region (14); a source of oxidant (26); a primary energy recovery device (30) having adjacent source (32) and sink (34) channels separated by an enthalpy exchange barrier (36) for the transfer of heat and moisture therebetween; at least one of the combustion-supported reaction means (20, 120), the cathode region (16), and the anode region (14) having an exhaust flow (42, 44,48, 148) for providing an exhaust gas stream (28, 128), the exhaust gas stream (28, 128) being operatively connected to flow through at least the source channel (32) of the primary energy recovery device (30); and wherein the oxidant source (26) is operatively connected to flow through at least the sink channel (34) of the primary energy recovery device (30) to provide the oxidant stream (124, 224, 324, 424) supplied to at least the combustion-supported reaction means (20, 120), the method of regulating the dew point of the oxidant stream (124, 224, 324, 424) supplied to at least the combustion-supported reaction means (20, 120) comprising the step of:

a) passively condensing (50) moisture from a gas stream (28, 128, 26', 126'), the gas stream being one or the other of:

i) the oxidant stream (26', 126') downstream of the flow of the oxidant source (26) through the sink channel (34) of the primary energy recovery device (30), thereby to effect direct regulation of said dew point; or ii) the exhaust gas stream (28, 128) upstream of the flow of the exhaust gas stream (28', 128') through the source channel (32) of the primary energy recovery device (30), thereby to effect indirect regulation of said dew point.

15. The method of claim 14 wherein the step of passively condensing (50) moisture from a gas stream (28, 128, 26', 126') comprises flowing (134) said gas stream in proximity with a liquid (52, 132) in a manner to effect a transfer (136) of heat and moisture between said liquid and gas streams as a function of at least the temperature of said liquid relative to said gas stream.

16. The method of claim 15 wherein the liquid (52) is water and the temperature of said water is regulated to effect the condensation needed to regulate the dew point of the oxidant stream (124, 224, 324, 424) supplied to at least the combustion-supported reaction means (20, 120).

17. The method of claim 15 wherein the liquid is water (52) and the step of passively condensing moisture from a gas stream comprises flowing (134) the gas stream (28, 128, 26', 126') and flowing (132) the water (52) along respectively opposite sides of a porous enthalpy exchange barrier (136) of a further energy recovery device (50) to effect said transfer of heat and moisture.

18. The method of claim 15 wherein the liquid is water (52) and the gas stream from which moisture is passively condensed (50) comprises the exhaust gas stream (28, 128) upstream of the flow of the exhaust gas stream (28', 128') through the source channel (32) of the primary energy recovery device (30), thereby to effect indirect regulation of said dew point.

* * * * *